United States Patent Office 3,239,350
Patented Mar. 8, 1966

3,239,350
ESTROGENIC COMPOUNDS AND ANIMAL GROWTH PROMOTERS
Edward B. Hodge, Phil H. Hidy, and Herbert L. Wehrmeister, all of Terre Haute, Ind., assignors to Commercial Solvents Corporation, a corporation of Maryland
No Drawing. Filed Feb. 15, 1965, Ser. No. 432,856
12 Claims. (Cl. 99—2)

The present invention relates to new compounds and an object of the present invention is to provide compounds which exhibit estrogenic activity or aid in increasing the rate of growth in meat-producing animals, e.g., cattle, lamb and swine.

A conventional formula for the compounds of the present invention is:

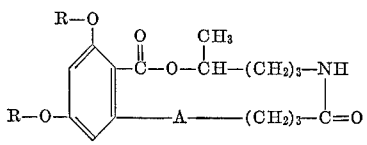

where A is the radical —CH=CH— or the radical —CH$_2$—CH$_2$— and R is hydrogen or substituted or unsubstitued alkyl, e.g., lower alkyl such as methyl, ethyl, hexyl, etc., but hydrogen is preferred. Compounds having the above formula wherein R is substituted or unsubstituted aryl, e.g., phenyl and bromophenyl; acyl, e.g., acetyl and valeryl; and aralkyl, e.g., benzyl, are also contemplated by the present invention.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new products are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use wtih cattle includes alfalfa hay and ground corn cobs together with supplementary vitaminaceous substances if desired.

The compounds of the present invention can be produced from the compound:

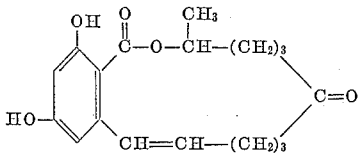

hereinafter referred to as the fermentation estrogenic substance (F.E.S.) by oximation of the ketone group and subsequent treatment in accordance with the Beckmann rearrangement procedure. The nomenclature used herein is based upon the F.E.S. compound. For example, the compound produced upon oximation of the ketone group is referred to as F.E.S. oxime. Oxime compounds where both R's are alkyl are referred to as dialkyl-, and where one of the R's is alkyl as monoalkyl-, F.E.S. oxime.

The oximation of the ketone group can be accomplished by reaction of the F.E.S. compound with hydroxylammonium chloride or a hydroxylammonium chloride reagent solution prepared by dissolving 0.7 gram hydroxylammonium chloride in 10 milliliters water, adding 0.5 gram triethanolamine and diluting to 100 milliliters with ethanol. The F.E.S. compound is added in amounts of 3 to 10 milligrams to 5 milliliters of made-up reagent and heated under reflux in a water bath to between about 70°–75° C. for about 1 to 3 hours.

The Beckmann rearrangement of F.E.S. oximes can be brought about by treatment of the oxime with phosphorus pentachloride in ether solution. The rearrangement also occurs under the influence of BF$_3$, sulfuric acid, aluminum chloride in benzene, hydrogen chloride in acetic acid, or benzene-sulfonyl chloride in pyridine. The treatment can be carried out under ambient conditions, or for example at temperatures of from about 0° to 100° C.

Compounds of the present invention where A is

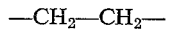

can be formed by reducing the olefinic bond of F.E.S. and oximating and rearranging the resultant dihydro F.E.S. as set forth supra. The reduction of the olefinic bond can be accomplished, for example, by hydrogenation in the presence of a Group VIII metal, particularly platinum or palladium, catalyst supported on a suitable carrier, e.g. charcoal. Generally the catalyst contains from about 0.01 to about 10% of the catalytic metal. The catalyst is used in a ratio of generally between about 0.02 and 2 grams and preferably between about 0.1 and 0.5 gram, particularly 0.2 gram, catalyst per gram of F.E.S. The reduction may be carried out while F.E.S. is suspended in a suitable solvent, e.g., an alcohol, especially a lower alkanol such as 2-propanol, ethanol, methanol, and acid, e.g., acetic acid, etc., at ambient temperatures or temperatures of, for example, 15° to 40° C., and ambient pressures since only the presence of hydrogen is required. The use of elevated pressure, e.g., from about 1 to 100 atmospheres is however preferred.

In producing compounds of the present invention where R is alkyl, conventional alkylation procedures can be used to replace the H atom of one or both of the OH groups on the benzene ring of F.E.S. with an alkyl group. Alkylated F.E.S. compounds of the present invention can be produced, for example, by alkylating the F.E.S. compounds, reducing the olefinic bond when reduction of the olefinic bond is desired, oximating them and rearranging them as set forth supra. The alkylation can be by reaction with the corresponding dialkyl sulfates, e.g., dimethyl sulfate, diethyl sulfate, etc. to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectively produced using diazomethane.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL-2830.

Example I

A spore sand culture containing *Gibberella zeae* (Gordon) NRRL-2830 was asceptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a sterile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL-2830 to produce F.E.S.

Example II

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

Example III

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The following example illustrates the production and rearrangement of dihydrodimethyl F.E.S. oxime.

Example IV

F.E.S. in acetic acid was catalytically hydrogenated at room temperature in the presence of PdO at a hydrogen pressure of about 45 p.s.i. to produce dihydro F.E.S., i.e., a compound where A is —$CH_2$—$CH_2$—. The dihydro F.E.S. was dissolved in a mixture of 10 NaOH and water. Dimethyl sulfate was added while the solution was stirred. The dihydrodimethyl F.E.S. so produced was then oximated as follows: To a solution of 2.65 grams dihydrodimethyl F.E.S. in a mixture of 50 milliliters ethanol and 40 milliliters pyridine was added 3.5 grams of hydroxylammonium chloride. The clear solution was refluxed for 2 hours and evaporated to a volume of 5–10 milliliters. Water (25 milliliters) was added and the aqueous mixture was extracted with benzene. The dried extract was evaporated to dryness to yield 2.99 grams of a tacky white solid. Crystallization of this product from a mixture of 10 milliliters water and 15 milliliters ethanol provided 1.2 grams of material which melted at 126°–128° C. Recrystallization of 65 milligrams of this material from aqueous ethanol provided 43 milligrams of dihydrodimethyl F.E.S. oxime having a melting point of 130°–132° C. and analyzing:

|  | Calc. ($C_{20}H_{29}NO_5$) | Found |
|---|---|---|
| Percent C | 66.10 | 66.52 |
| Percent H | 8.04 | 8.03 |
| Percent N | 3.85 | 3.91 |

A cold (ice bath) solution of 4.0 grams of the dihydrodimethyl F.E.S. oxime in 200 milliliters ether was added to a cold solution of 4.8 grams $PCl_5$ in 200 milliliters ether. The mixture was stirred at ice bath temperature for one hour and at room temperature for two hours. The clear solution was left at room temperature overnight. The solution was then added with stirring to 600 milliliters ice water. Chloroform (50 milliliters) was used to rinse out the flask. After stirring an additional 20 minutes the layers were separated and the aqueous layer was further extracted with chloroform. The dried ether-chloroform solution was evaporated to dryness.

A second reaction was carried out as in the above paragraph and the two products were combined to yield 8.5 grams of amorphous material, dimethyldihydro F.E.S. lactam, having a melting point of 119°–121° C. and the formula:

$$CH_3O\text{-phenyl-}\overset{O}{\overset{\|}{C}}-O-\overset{CH_3}{\underset{|}{CH}}-(CH_2)_3-NH$$
$$CH_3O-\phantom{xxxxxxx}-(CH_2)_5-\phantom{xx}C=O$$

Thin layer chromatography indicated this material to be of high purity. An infrared spectrum of this material was consistent for the lactam-lactone expected. Analysis showed percent N, 3.63; theory percent N, 3.85.

Example V

Dihydro F.E.S. oxime is produced following the procedure of Example IV omitting the alkylation, and then it is rearranged by treatment with a solution of $BF_3$ in ether to provide a compound of the present invention where R is H and A is —$CH_2$—$CH_2$—.

Example VI

Dihydrodiethyl F.E.S. oxime is produced following the procedure of Example IV, substituting diethyl sulfate for the dimethyl sulfate, and then rearranged by treatment with a solution of $PCl_5$ in ether to produce a compound of the present invention where R is ethyl and A is —$CH_2$—$CH_2$—.

The following example illustrates the oximation and rearrangement of F.E.S.

Example VII

A hydroxylammonium chloride reagent solution is prepared by dissolving 0.7 gram hydroxylammonium chloride in 10 milliliters water, adding 0.5 gram triethanolamine, and diluting to 100 milliliters with ethanol. The F.E.S. is added in amounts of 3 to 10 milligrams to 5 milliliters of made-up reagent and heated under reflux in a water bath to between about 70°–75° C. for about 1 to 3 hours. After cooling, 3 drops of indicator, 0.1% bromophenol blue in 20% aqueous ethanol, are added and excess triethanolamine titrated back with 0.02 NHCl. The equivalent weight is given by:

$$E = \frac{a \cdot 1000}{b \cdot n}$$

where $a$ grams of F.E.S. liberate an amount of acid corresponding to $b$ milliliters base of normality $n$. This procedure when applied to a total of 53 milligrams F.E.S. indicated a F.E.S. equivalent weight of 328 which indicates that F.E.S. has one oximatable carbonyl group.

Dilution of the titration mixtures with water yielded two crops of crystals: crop A, 12.9 milligrams having a melting point of 200°–202° C.; and crop B, 19.9 milligrams having a melting point of 201°–203° C. Crops A and B were combined and recrystallized from a mixture of 10 milliliters ethanol and 20 milliliters water to provide 23 milligrams of F.E.S. oxime having a melting point of 202.5°–205.5° C. and analyzing:

|  | Calc. ($C_{18}H_{23}O_5N$) | Found |
|---|---|---|
| Percent C | 64.84 | 63.62 |
| Percent H | 6.95 | 7.05 |
| Percent N | 4.20 | 4.15 |

The F.E.S. oxime is rearranged following the procedure of Example V, to produce F.E.S. lactam, a compound of the present invention where A is —CH=CH— and R is H.

*Example VIII*

Following the procedure of Example VII, 491 milligrams of F.E.S. provided 504 milligrams of product, M.P. 207°–209° C., which was recrystallized from a mixture of 20 milliliters ethanol and 25 milliliters water to yield 357 milligrams of F.E.S. oxime having a melting point of 210°–211° C. and analyzing:

|  | Calc. ($C_{18}H_{23}O_5N$) | Found |
|---|---|---|
| Percent C | 64.84 | 64.91 |
| Percent H | 6.95 | 6.97 |
| Percent N | 4.20 | 4.22 |

The F.E.S. oxime is rearranged following the procedure of Example V.

*Example IX*

Dimethyl F.E.S. oxime is produced by reaction of F.E.S. with dimethyl sulfate in alkaline solution and oximated and rearranged according to the procedure of Example IV.

*Example X*

Six head of cattle are fed a daily ration including a mixture of alfalfa hay and ground corn cobs containing from 1 to 20 ounces of F.E.S. lactam per hundred pounds of ration.

*Example XI*

Six head of cattle are fed a daily ration including a mixture of alfalfa hay and ground corn cobs containing from 1 to 20 ounces of dihydrodimethyl F.E.S. lactam per hundred pounds of ration.

It is claimed:
1.

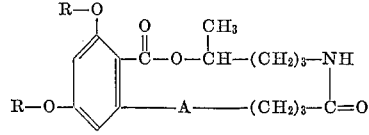

where A is selected from the group consisting of the radical —CH=CH— and the radical —CH₂—CH₂— and R is selected from the group consisting of hydrogen and lower alkyl.

2. An animal feed comprising a nutritional diluent and a growth promoting amount of the compound of claim 1.
3. The compound of claim 1 wherein A is the radical —CH=CH— and R is methyl.
4. The compound of claim 1 wherein A is the radical —CH=CH— and R is hydrogen.
5. The compound of claim 1 wherein A is the radical —CH₂—CH₂— and R is methyl.
6. The compound of claim 1 wherein A is the radical —CH₂—CH₂— and R is ethyl.
7. The compound of claim 1 wherein A is the radical —CH₂—CH₂— and R is hydrogen.
8. An animal feed comprising a nutritional diluent and growth promoting amounts of the compound of claim 3.
9. An animal feed comprising a nutritional diluent and growth promoting amounts of the compound of claim 4.
10. An animal feed comprising a nutritional diluent and growth promoting amounts of the compound of claim 5.
11. An animal feed comprising a nutritional diluent and growth promoting amounts of the compound of claim 6.
12. An animal feed comprising a nutritional diluent and growth promoting amounts of the compound of claim 7.

References Cited by the Examiner

UNITED STATES PATENTS 2,842,051    7/1958    Brian et al. _____ 99—2

OTHER REFERENCES

Stob et al., Nature, vol. 196, page 1318, December 29, 1962.

A. LOUIS MONACELL, *Primary Examiner.*